United States Patent [19]
Heston

[11] 3,983,038
[45] Sept. 28, 1976

[54] SELF-PURGING SCREEN CHANGER AND STRAINER PLATE

[76] Inventor: Eugene E. Heston, 548 Parkside Drive, Akron, Ohio 44313

[22] Filed: Nov. 3, 1975

[21] Appl. No.: 628,536

[52] U.S. Cl. .................................. 210/447; 277/12
[51] Int. Cl.² ...................... B01D 35/00; B29F 3/01
[58] Field of Search ............... 277/12, 29; 210/446, 210/447, 448; 425/197–202

[56] References Cited
UNITED STATES PATENTS

| | | | |
|---|---|---|---|
| 2,822,197 | 2/1958 | Champ et al. | 277/29 |
| 3,675,934 | 11/1972 | Heston | 210/447 |
| 3,743,101 | 7/1973 | Schmidt | 210/447 |

Primary Examiner—Robert I. Smith
Attorney, Agent, or Firm—Frederick K. Lacher

[57] ABSTRACT

A screen changer having a replacement strainer plate in sealing engagement with a sealing plate and grooves in the engaged surfaces of the strainer plate and the sealing plate for communicating extruded material from the changer opening to the central strainer portion of the replacement strainer for prefilling and purging the strainer of air. The grooves are closed in the storage position of the strainer plate and opened in a preliminary change position for purging the strainer. The strainer has a venting space at one side of the central strainer portion which is in communication with a vent in a cover plate for venting air from the replacement strainer as it is being prefilled with the extruded material.

14 Claims, 7 Drawing Figures

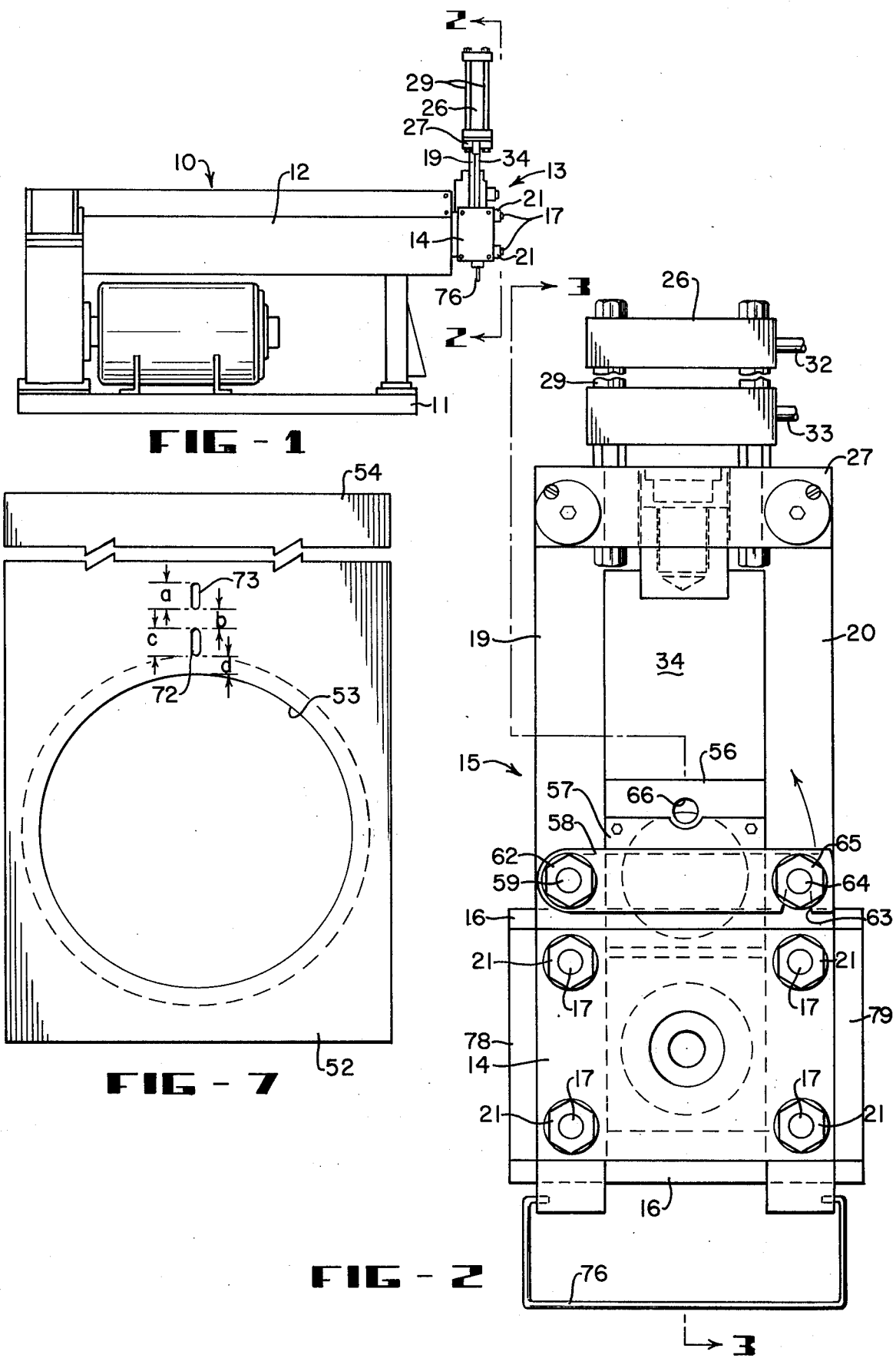

SELF-PURGING SCREEN CHANGER AND STRAINER PLATE

BACKGROUND OF THE INVENTION

The present invention relates to screen changing apparatus for use with extruders of plastics, rubber and other material. The screen changer supports a strainer plate having a strainer or screen pack through which the extruded material passes for removing impurities and providing the necessary backpressure in the extruder cylinder. After a period of operation, the strainer plate screen becomes clogged with impurities and unplastified material and must be changed or replaced with a clean screen. An example of a screen changer of this type is shown and described in my U.S. Pat. No. 3,675,934 dated July 11, 1972.

One of the problems experienced with screen changers is that when the replacement strainer plate is substituted for the strainer plate having the clogged or dirty screen, the air in the replacement screen results in air bubbles or discontinuities in the extruded product. Some screen changers have ports in the seal plates with a valve for opening the ports to the extruder passage for communication of the extruded material from the extruder passage to the screen of the replacement strainer plate. A bleed valve in communication with the screen of the replacement plate vents the air from the strainer. This arrangement provides prefilling and venting of the strainer of the replacement strainer plate; however, the ports must be kept open and free of contamination to be effective. The valves must be maintained and operated at the proper times.

SUMMARY OF THE INVENTION

It is a principal object of the present invention to provide a screen changer and strainer plate construction in which the purging of the replacement strainer plate automatically takes place upon initial movement of the strainer plate towards the opening for conveying extruded material.

Another object is to provide passages in the strainer plate and screen changer sealing plate which are closed during normal operations but which communicate extruded material to the strainer in a preliminary change position of the replacement strainer plate.

A further object of the invention is to provide vent means in communication with the strainer of the replacement strainer plate for venting air from the strainer as it is being prefilled.

A still further object of the invention is to provide a strainer plate construction having grooves at both ends for communicating extruded material to a replacement strainer plate as the strainer plate is moved into the opening conveying the extruded material and as it is moved out of that opening.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the drawings:

FIG. 1 is a side elevation of an extruder with a screen changer embodying the invention mounted thereon.

FIG. 2 is an enlarged end view taken along the plane of line 2—2 of FIG. 1 with parts being broken away.

FIG. 7 is an enlarged fragmentary view of the sealing plate taken along the plane of line 7—7 of FIG. 3 showing the surface in mating engagement with the surfaces of the strainer plates shown in FIG. 6.

DETAILED DESCRIPTION

Figure 3:
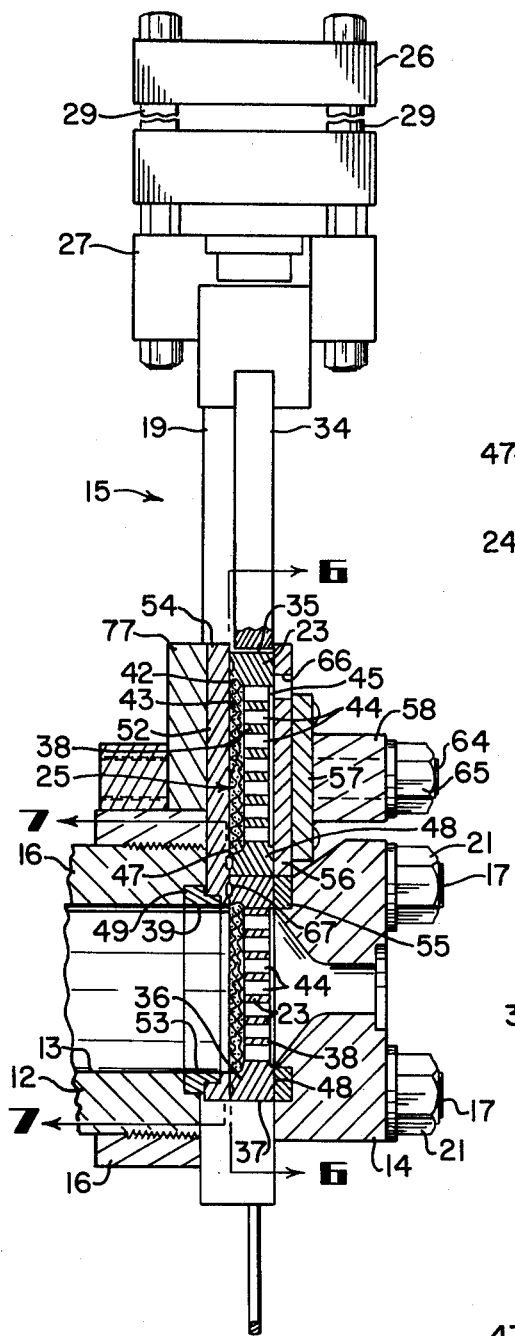
FIG. 3 is an enlarged fragmentary view partly in section taken along the planes of lines 3—3 of FIG. 2.

Referring to FIG. 1, an extruder 10 is shown having a base 11 and a cylinder 12 which may be heated or cooled by apparatus surrounding the cylinder (not shown). Material to be extruded is fed into the cylinder 12 at the left end of the extruder 10, as shown in FIG. 1, and the rotation of a feed screw in the cylinder moves the material to the right to an outlet end 13 where the material is extruded through a die block 14 or other suitable apparatus for producing the extruded product.

As shown more clearly in FIGS. 2 and 3, a screen changer 15 is mounted on the cylinder 12 by means of a threaded supporting member 16 screwed on the end of the cylinder. Studs 17 are fastened to the supporting member 16 and extend through holes in the die block 14 and through holes in side bars 19 and 20 of the screen changer 15 interposed between the die block and supporting member. Nuts 12 are threaded on the studs 17 for mounting of the die block 14 and the screen changer 15. The side bars 19 and 20 extend upwardly from the die block 14 a distance sufficient to permit the insertion of a strainer plate 23 in a storage position 24 of the strainer plate and in a storage area 25 of the screen changer 15.

At the upper ends of the side bars 19 and 20 is a piston-cylinder assembly 26 which is mounted on a cross-bar 27 by means of tie rods 29 extending through the crossbar and through the ends of the piston-cylinder assembly. The piston-cylinder assembly 26 is double acting and preferably of a hydraulic type with conduits 32 and 33 for supplying hydraulic fluid under pressure from a suitable control and hydraulic pressure power source (not shown). The piston of the piston-cylinder assembly 26 extends downwardly between the side bars 19 and 20 and is connected to a ram 34 for engagement with a trailing edge 35 of the strainer plate 23 in the storage position 24.

Figure 6:
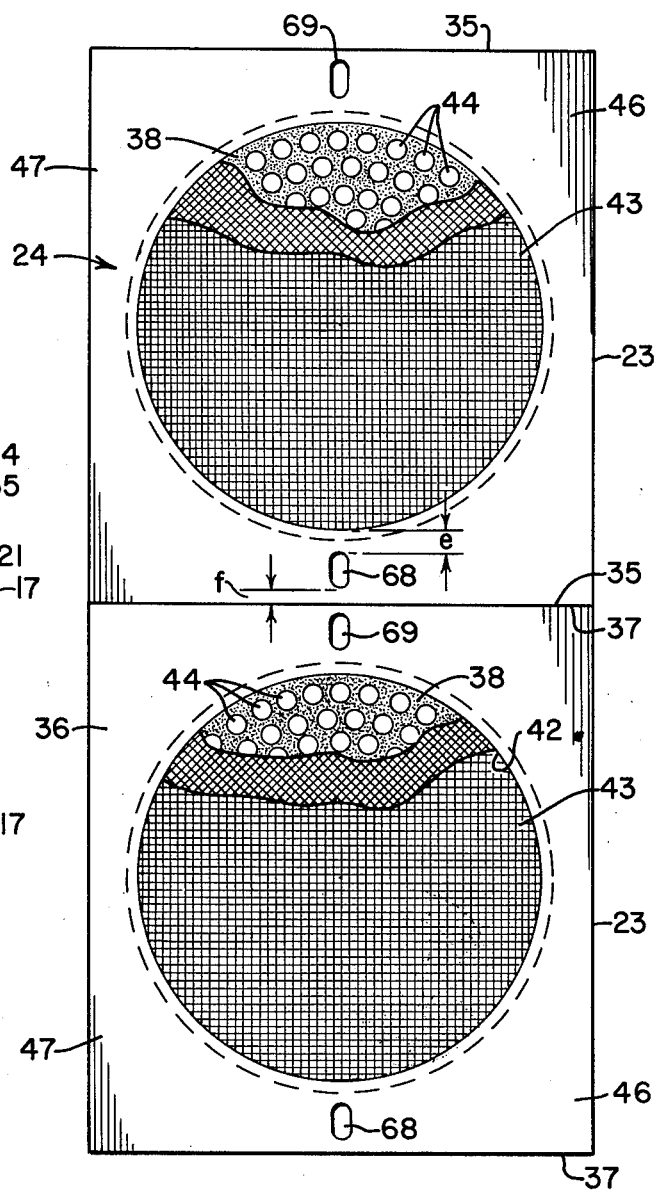
FIG. 6 is an enlarged view of the strainer plates taken along the plane of line 6—6 of FIG. 3.

Referring to FIGS. 3 and 6, one strainer plate 23 is shown in the operating position 36 and one strainer plate is shown in the storage position 24. The strainer plate 23 is generally rectangular with a leading edge 37 for engaging the trailing edge 35 of another strainer plate. The strainer plate 23 has a central strainer portion 38 which is preferably circular to correspond with a circular opening 39 in the cylinder 12 through which the extruded material passes. The central strainer portion 38 has a recess 42 in the upstream side of the strainer plate 23 in which a screen pack 43, made up of a plurality of screens, may be mounted. Behind the recess 18 is a central reinforcement portion having a plurality of holes 44 through which the extruded material may pass. At the downstream side of the strainer plate 23, the central strainer portion 38 is recessed to provide a pocket or venting space 45. Surrounding the central strainer portion 38 of the strainer plate 23 is a supporting portion 46 having an upstream surface 47 and a downstream surface 48.

Referring again to FIG. 3, a cylindrical collar 49 is inset in the end of the cylinder 12 and engages a first sealing plate 52 which has an opening 53 corresponding to the circular opening 39 for conveying extruded material. The sealing plate 52 extends upwardly to an upper edge 54 which extends beyond the storage position 24 of the replacement strainer plate 23 and provides one side of the storage area 25 in the screen changer 15. This sealing plate 52 may be of aluminum-bronze to provide for sealing and sliding engagement with the upstream surface 47 of the strainer plate 23. A second sealing plate 55 is inset in the die block 14 and provides an annular surface for sealing engagement with the downstream surface 48 of the strainer plate 23 in the operating position 36. This second sealing plate 55 may also be of aluminum-bronze or other similar material for sliding engagement with the downstream surface 48 of the strainer plate 23.

Above the second sealing plate 55 is a cover plate 56 which may also be of aluminum-bronze having a surface for sealing and sliding engagement with the downstream surface 48 of the strainer plate 23 in the storage position 24. The cover plate 56 also provides the opposite side from the sealing plate 52 of the storage area 25 in the screen changer 15. The cover plate 56 is fastened to a reinforcing plate 57 of steel or other material having high tensile strength and the reinforcing plate is mounted on a pivoted bar 58 as by welding. The bar 58 is pivoted at one end around a bolt 59 extending through the side bar 19 with a nut 62 threaded thereon. At the other end of the pivoted bar 58, there is a slot 63 which fits over a bolt 64 extending through side bar 20 with a nut 65 threaded on the end thereof. The pivoted bar 58, reinforcing plate 57 and cover plate 56 swing as a unit in the direction indicated by the arrow in FIG. 3, to a position on the other side of side bar 19 so that the strainer plate 23 can be inserted in the storage area 25 after which the cover plate, reinforcing plate and pivoted bar can be swung back to a position where the bolt 64 enters the slot 63. The cover plate 56 has a vent hole 66 in communication with the storage area 25 and particularly with the venting space 45 in the central strainer portion 38 of the replacement strainer plate 23 in the storage position 24.

Between the first sealing plate 52 and second sealing plate 55, a slot 67 extends from the storage area 25 of the screen changer 15 to the opening 39 for the movement of the replacement strainer plate 23 in the storage position 24 towards the operating position 36. As shown in FIGS. 3 and 6, the strainer plate 23 has a groove 68 located between the central strainer portion 38 and the leading edge 37. The strainer plate 23 also has a groove 69 located between the central strainer portion 38 and the trailing edge 35. The sealing plate 52 has two grooves 72 and 73 located between the opening 53 in the sealing plate and the upper edge 54. The grooves 72 and 73 in the sealing plate 52 are the same size as the grooves 68 and 69 in the strainer plates 23.

Figure 4:
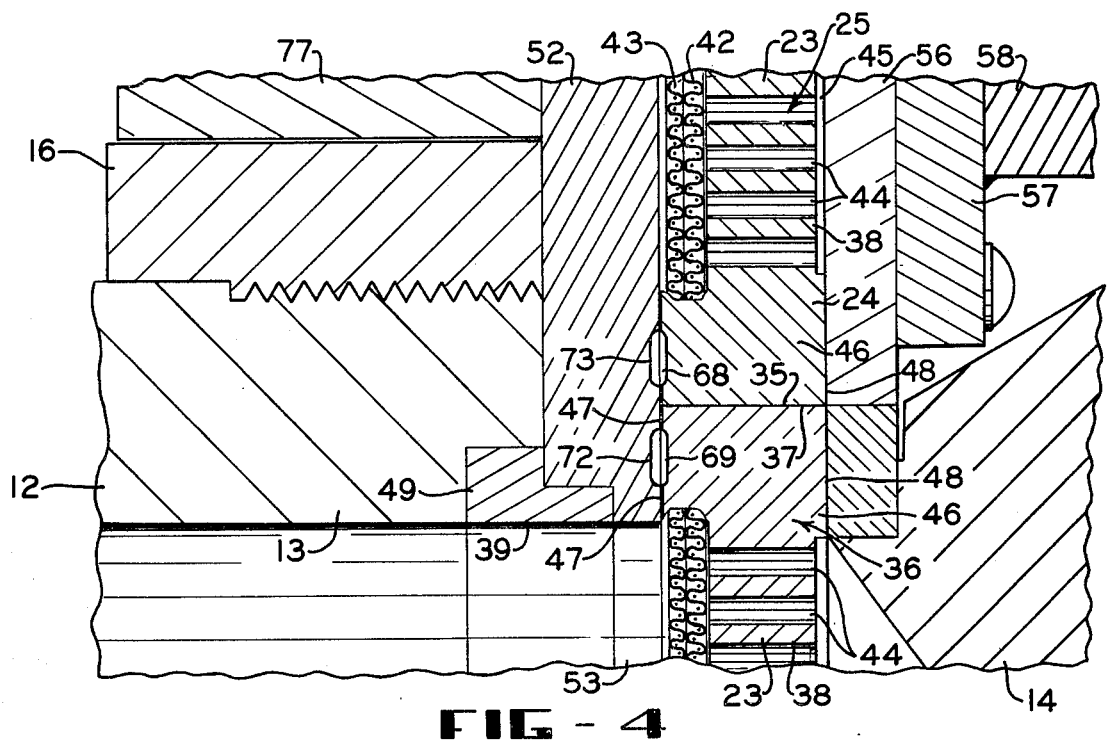
FIG. 4 is an enlarged fragmentary view like FIG. 3 showing the strainer plates in the normal operating position of the screen changer.
Figure 5:
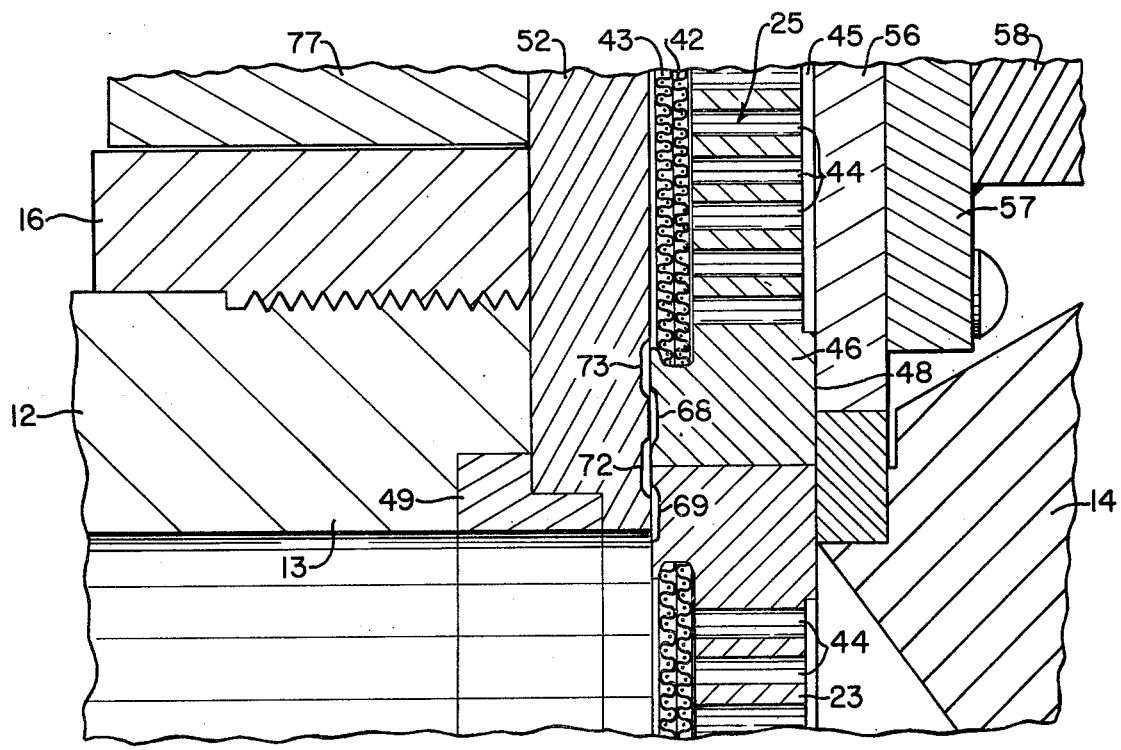
FIG. 5 is a view like FIG. 4 showing the strainer plates in the preliminary change position.

As shown in FIGS. 3 and 4, the grooves 68, 69, 72 and 73 are in communication with each other but closed from communication with the opening 39 and the storage area 25 when one strainer plate 23 is in the operating position 36 and the other strainer plate is in the storage position 24. When the piston-cylinder assembly 26 is actuated, the ram 34 moves the replacement strainer plate 23 from the storage position 24 to a preliminary change position 74, as shown in FIG. 5, and the grooves 68 and 69 of the strainer plates are offset from the grooves 72 and 73 of the sealing plate 52 providing a passage 75 from the opening 39 to the storage area 25 and particularly to the recess 42 of the central strainer portion 38. In this preliminary change position 74, the extruded material will pass through the passage 75 into the central strainer portion 38 and through the holes 44 to the venting space 45 while the air is purged from the replacement strainer plate 23 and forced out through the vent hole 66.

To accomplish this result, the distance between the ends of the grooves 68, 69, 72 and 73 and the edges of the sealing plate 52 and strainer plate 23 is less than the length of the grooves. For example, with reference to FIG. 7, the length ($a$) of groove 73 and the length ($c$) of groove 72 is three-eighths inch and the distance ($b$) between the grooves 72 and 73 and the distance ($d$) between the groove 72 and the edge of the opening 53 is one-quarter inch. Referring to FIG. 6, the distance ($e$) between the edge of the recess 42 of the central strainer portion 38 and the groove 68 is one-quarter inch whereas the distance ($f$) between the end of the groove 68 and the leading edge 37 of the strainer plate 23 is one-eighth inch. The length ($g$) of the strainer plate groove 68 is three-eighths inch which is the same as the lengths ($a$) and ($c$) of sealing plate grooves 72 and 73. The length ($h$) of strainer plate groove 69 and its position relative to the trailing edge 35 and edge of the recess 42 of the strainer plate is the same as the strainer plate groove 68. With this construction, the two strainer plates 23 are moves three-eighths inch from the operating position 36 and storage position 24, as shown in FIG. 4, to the preliminary change position 74, as shown in FIG. 5, to provide the passage 75 communicating extruded material between the opening 39 and central strainer portion 38 of the replacement strainer plate in the storage area 25.

When the extruded material fills the space in the central strainer portion 38 between the first sealing plate 52 and the cover plate 56, the air will be purged from the central strainer portion at which time the piston-cylinder assembly 26 may be actuated to move the ram 34 downward a distance sufficient to force the replacement strainer plate 23 into the operating position 36 and the other strainer plate downward into engagement with a hanger 76 pivotally mounted on the side bars 19 and 20. By swinging the hanger 76 to one side or the other, the strainer plate 23 with the clogged and dirty screen pack 43 can be removed and cleaned.

In the installation and operation of the screen changer 15, it is desirable to heat the strainer plate 23 and other parts. For this purpose, a preheater 77 for heating the replacement strainer plate 23 in the storage area 25 is located next to the sealing plate 52. Also, body heaters 78 and 79 may be located on each side of the die block 14, as shown in FIGS. 1 and 2. The preheater 77 and body heaters 78 and 79 may be connected by suitable wiring to a source of electrical power and the temperatures controlled by thermostats or other suitable control equipment.

In the present embodiment, the grooves 68 and 69 in the strainer plates 23 and the grooves 72 and 73 in the sealing plate 52 have a depth of one-sixteenth inch so that the passage 75 in the preliminary change position 74 will have a depth of one-sixteenth inch. The width of the grooves 68, 69, 72 and 73 in the example shown is also one-sixteenth inch.

In operation, the strainer plate 23 is installed in the operating position 36 by loosening the nuts 21 and sliding the strainer plate into position between the first sealing plate 52 and second sealing plate 55. The body heaters 78 and 79 are actuated to bring the strainer plate 23 and surrounding parts up to a predetermined temperature. The nuts 21 are then tightened providing a tight seal between the upstream surface 47 of the supporting portion 46 and the sealing plate 52 and between the downstream surface 48 and the second sealing plate 55.

The replacement strainer plate 23 is then inserted in the storage position 24 as described hereinabove and the preheater 77 actuated to preheat the replacement strainer plate. Pressure is then applied to urge the sealing plate 52 and cover plate 56 against the upstream surface 47 and downstream surface 48 of the supporting portion 46 by turning the nuts 62 and 65 on the bolts 59 and 64.

After the extruder 10 has been operated for a period of time, the screen pack 43 in the strainer plate 23 in the operating position 36 will become partially clogged and a change will be required. The piston-cylinder assembly 26 may then be actuated by conveying hydraulic fluid under pressure through conduit 32 into the cylinder and forcing the ram 34 downward into engagement with the trailing edge 35 of the replacement strainer plate 23 in the storage position 25. This pressure will be continued until the replacement strainer plate 23 reaches the preliminary change position 74, shown in FIG. 5. Extruded material from the opening 39 then enters the passage 75 between the grooves 68 and 69 of the strainer plates 23 and grooves 72 and 73 of the sealing plate 52 conveying the extruded material to the central strainer portion 38 which will be prefilled and the air purged through the vent hole 66 in the cover plate 56.

When the extruded material starts to leak out of the vent hole 66 or at a predetermined time, the piston-cylinder assembly 26 will be actuated again moving the ram 34 downward and forcing the prefilled replacement strainer plate 23 into the operating position 36. The strainer plate 23 which was in the operating position will be forced downward into engagement with the hanger 76 after which it can be removed and the screen pack 43 cleaned. This strainer plate 23 or another replacement strainer plate may then be placed in the storage area 25 of the screen changer 15 ready for the next change operation.

As indicated above, the hydraulic pressure in the piston-cylinder assembly 26 may be controlled by a timer for actuation at predetermined intervals to automatically move the replacement strainer plate 23 from the storage position 24 to the preliminary change position 74, hold the replacement strainer plate at this position for a predetermined period of time necessary to purge the central strainer portion 38 and then increase the hydraulic pressure to force the replacement strainer plate into the operating position 36. In this way the screen changer 15 can purge the replacement strainer plate 23 and then move it into the operating position 36 automatically without the necessity of an operator being present during the strainer plate change.

In the present embodiment, the replacement strainer plate 23 is moved into the storage area 25 by swinging the pivoted bar 58, reinforcing plate 57 and cover plate 56 to the other side of the side bar 19. An alternative screen changer embodying this invention could have a third position above the storage position 24 wherein the strainer plate could be inserted above the storage area and below the ram 34. Then to actuate the mechanism, the ram 34 would push the top strainer plate against the replacement strainer plate in the storage area 25 and the procedure would be the same as outlined above except that after the replacement strainer plate was moved into the operating position, the other strainer plate 23 would be in the storage area.

While certain representative embodiments and details have been shown for the purpose of demonstrating the invention, it will be apparent to those skilled in the art that various changes and modifications may be made therein without departing from the spirit or scope of the invention.

I, therefore, particularly point out and distinctly claim as my invention:

1. In combination, a strainer plate for a screen changer having a slot through which said strainer plate is moved from a storage position to an operating position in an opening for straining extruded material, said strainer having a leading edge, a trailing edge, a central strainer portion, a supporting portion surrounding said strainer portion, said supporting portion having a surface in sealing engagement with a sealing plate on said screen changer, a groove in said surface extending in a direction from said leading edge to said central strainer portion, said groove being closed by said sealing plate when said strainer is in said storage position and said groove being open and in communication with said central strainer portion and said opening in a preliminary change position of said strainer with said strainer moved a predetermined distance from said storage position towards said operating position for prefilling said central strainer portion in the storage position and venting air out of said central strainer portion prior to movement of the strainer from said preliminary change position to said operating position.

2. The combination of claim 1 wherein said central strainer portion is recessed at the surface opposite to said surface of said supporting portion containing said groove to provide a vent space at said central strainer portion for venting air out of said strainer.

3. The combination of claim 1 wherein the distance from the ends of said groove to said leading edge is less than the length of said groove.

4. The combination of claim 1 wherein said central strainer portion includes a recess for a screen and a central reinforcement having a plurality of holes for conveying extruded material through said strainer and said recess being on the same side of said strainer as said surface of said supporting plate containing said groove.

5. The combination of claim 1 wherein said opening in said screen changer is circular and said central strainer portion is circular to conform with said opening.

6. The combination of claim 1 wherein said strainer plate is rectangular with a trailing edge at the opposite side from said leading edge and a second groove located in the surface of said supporting plate between said central strainer portion and said trailing edge.

7. In combination, a screen changer having a storage area for storing a replacement strainer plate in a storage position, an opening for conveying extruded material, a slot extending from said storage area to said opening, a sealing plate at one side of said slot for sealing engagement with said strainer plate, a groove in the surface of said sealing plate extending in a direction between said storage area and said opening, said groove being in communication with a central strainer portion of said strainer plate and said opening in a preliminary change position of said changer with said replacement strainer plate moved a predetermined distance from said storage position towards said opening and vent means in said storage area for venting air out of said central strainer portion prior to movement of said strainer to an operating position covering said opening.

8. The combination of claim 7 wherein said storage area has a removable cover plate for removal during insertion of said strainer plate into said storage area and said cover plate includes vent means for releasing air from said central strainer portion.

9. The combination of claim 8 including ram means for moving said strainer plate from said storage position to said operating position covering said opening.

10. The combination of claim 7 wherein said sealing plate has a second screen changer groove extending in the same direction as said first groove and the distance between said first and second grooves is less than the length of said grooves.

11. In combination, a screen changer having a storage area, a replacement strainer plate in a storage position in said area, an opening for conveying extruded material adjacent said storage area, a slot extending from said storage area to said opening and said strainer plate being slidably mounted in said slot, said strainer plate having a central strainer portion and a supporting portion surrounding said strainer portion, a sealing plate on one side of said slot, said supporting portion of said strainer plate having a surface in sealing engagement with said sealing plate, a strainer groove in said surface of said supporting portion extending in a direction between said storage area and said opening, a sealing plate groove in the surface of said sealing plate extending in the same direction as said strainer groove, said strainer groove and said sealing plate groove being in communication with said opening and said central strainer portion in a preliminary change position of said screen changer with said strainer plate moved a predetermined distance from said storage position towards said opening to convey extruded material to said central strainer portion and vent means in said storage area for venting air out of said central strainer portion prior to movement of said strainer plate from said change position to a position covering said opening.

12. The combination of claim 11 wherein said sealing plate has a second sealing plate groove extending in the same direction as said first groove and located between said first sealing plate groove and said opening, an operating strainer plate in said opening for straining extruded material having a central strainer portion extending over said opening and a supporting portion surrounding said central strainer portion, said supporting portion of said operating strainer plate having a surface in sealing engagement with said sealing plate and a strainer groove in said surface extending in a direction between said storage area and said opening, said second sealing plate groove and said strainer groove in said surface of said operating strainer plate being in communication with said opening and said central strainer portion of said replacement strainer plate in said preliminary change position of said screen changer with said operating strainer plate moved said predetermined distance from said opening away from said storage area.

13. The combination of claim 12 wherein said operating strainer plate has a leading edge and a trailing edge, said replacement strainer plate has a leading edge and trailing edge and said leading edge of said replacement strainer plate being in engagement with said trailing edge of said operating strainer plate, ram means in engagement with said trailing edge of said replacement strainer plate for moving said operating strainer plate and said replacement strainer plate.

14. The combination of claim 13 wherein the distance between said grooves is less than the length of the grooves and the distance between the edge of the central strainer portion and said strainer grooves is less than the length of said strainer groove whereby a passage from said opening through said grooves to said central strainer portion of said replacement strainer plate is provided to convey extruded material from said opening to said central strainer plate in said preliminary change position of said screen changer.

* * * * *